Oct. 26, 1937.   H. J. MARLOWE   2,097,032
VEHICLE JACK
Filed Dec. 28, 1935   2 Sheets-Sheet 1
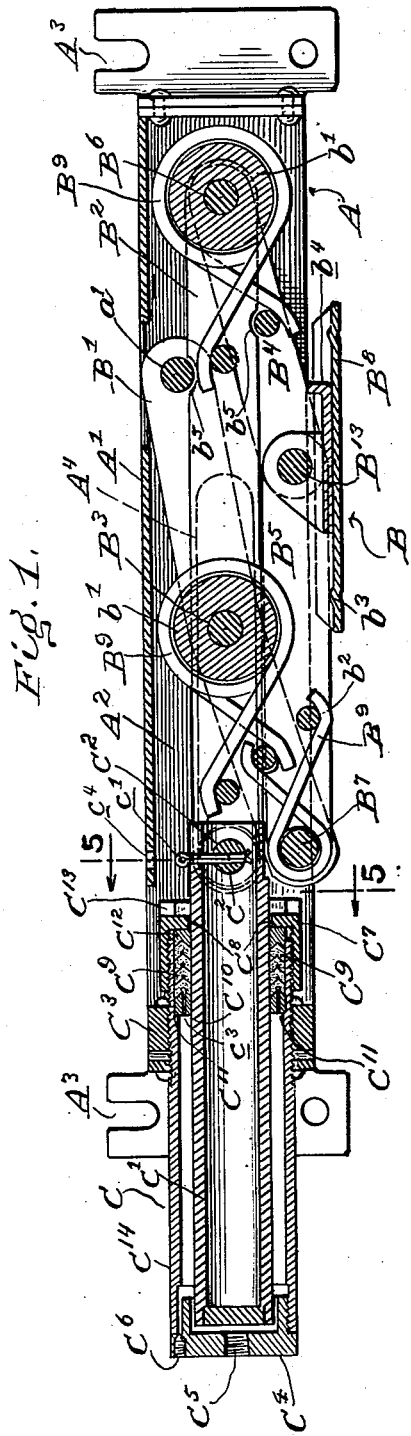
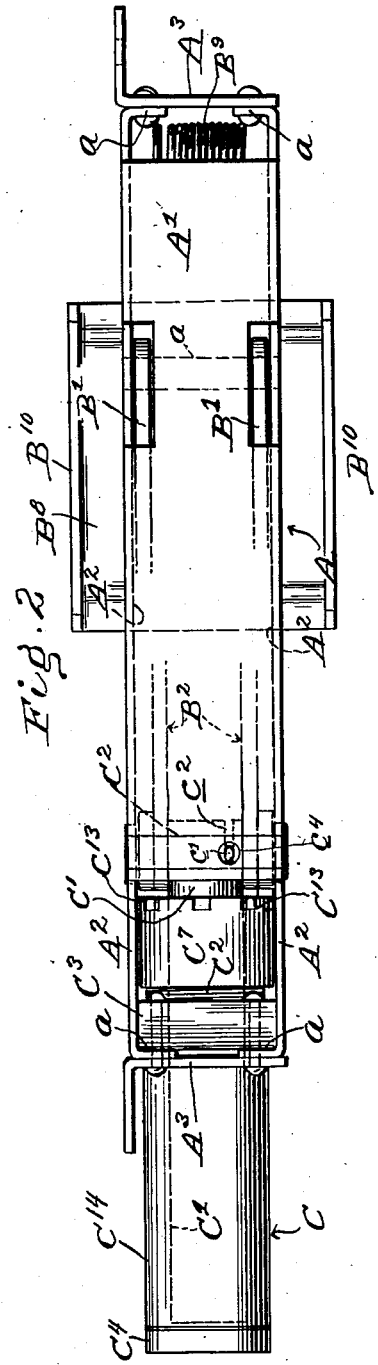
INVENTOR.
Harold J. Marlowe
BY Morrison, Kennedy & Campbell
ATTORNEYS Oct. 26, 1937.                H. J. MARLOWE                    2,097,032
                              VEHICLE JACK
                           Filed Dec. 28, 1935              2 Sheets—Sheet 2
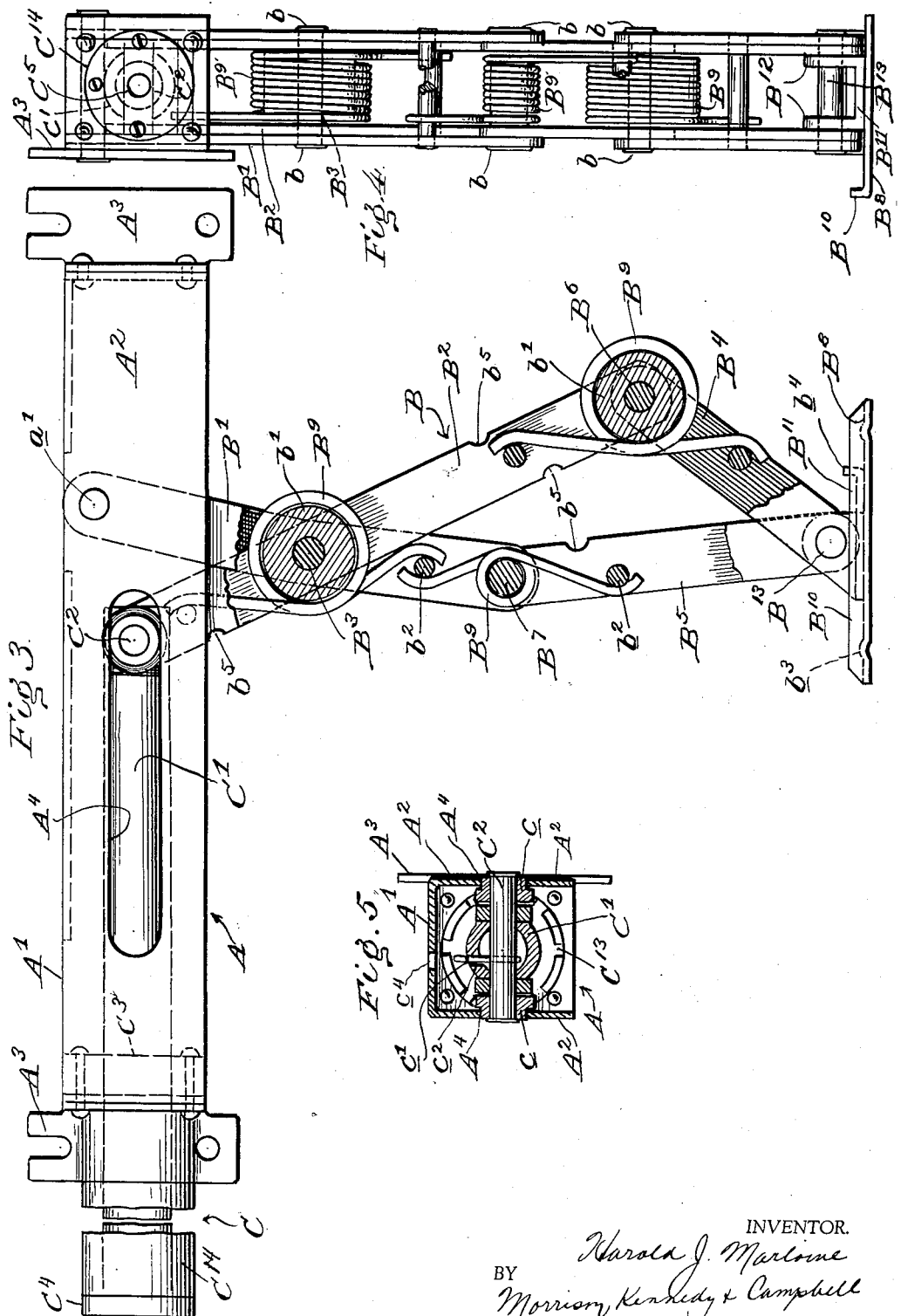
INVENTOR.
Harold J. Marlowe
BY Morrison, Kennedy & Campbell
ATTORNEYS

Patented Oct. 26, 1937

2,097,032

UNITED STATES PATENT OFFICE

2,097,032

VEHICLE JACK

Harold J. Marlowe, New Rochelle, N. Y., assignor to Jackomatic Corporation, a corporation of Delaware Application December 28, 1935, Serial No. 56,441

9 Claims. (Cl. 254—124)

This invention relates to vehicle jacks of the general organization wherein there is provided a plurality of links arranged in lazy tong formation, with one of the upper links at its upper end pivotally secured to a support and the other upper link at its upper end movable along the support in one direction to effect the extension of the lazy tong linkage to raise the vehicle, and in the opposite direction to effect the retraction of the linkage to lower the vehicle, and wherein there is also provided actuating means connected to the latter mentioned link at its movable end for effecting the extension of the linkage as just stated. More specifically, the invention concerns itself chiefly with the arrangement of the link members particularly with regard to their relative lengths and the manner in which they are connected to the supporting member to secure the advantage of compactness, a feature of prime importance in jacks adapted for permanent mounting on a vehicle as is the case here.

The supporting member referred to, is in the form of a U-shaped bracket, open at the bottom, and furnished with devices whereby it may be permanently secured to some part of the unsprung portion of the vehicle as for instance the axle. The bracket acts as a housing for the linkage and the pivotal connection by which one of the upper lazy tong link members is secured thereto is offset from the line of movement of the upper end of the other upper link member, i. e., it is located above such line of movement so that the latter link, in the retracted position of the jack, will throughout its entire length, lie parallel with the upper and lower edges of the supporting bracket and in line with the actuating means that effects the extension of the jack linkage. Then, too, the link just mentioned is substantially longer than the other links in the unit, and its pivotal connection with the other link is located substantially nearer its movable end than to its other end, so that for a given movement of the actuating means, the distance through which the jack is extended is greater than would be the case if the links were of equal size as ordinarily. The other members of the lazy tong linkage, i. e., the pair connected at the lower ends of the two upper links and which at their lower extremities are pivotally connected one to the other and also to a shoe adapted to contact with the ground, are so proportioned that when the jack is in its retracted position, that connected to the link pivotally secured to the support, lies throughout its entire length in contact with the other upper link member and thus like said link member rests in parallel relation with the upper and lower edges of the supporting bracket.

The jack actuating means includes a cylinder and piston mechanism, the cylinder being permanently secured to the supporting bracket and the piston arranged in the cylinder and secured at its outer end pivotally to the upper movable end of the lazy tong linkage, the arrangement being such that as liquid is admitted into the cylinder, the piston is forced outwardly to effect the extension of the lazy tong linkage, the retraction of the linkage and the return of the piston into the cylinder being effected by torsion springs located at the pivotal connections of the linkage. The piston and linkage are connected together by a transversely extending pin provided at its outer ends with rollers arranged to track in guide slots formed in the sides of the supporting bracket. According to this arrangement, all vertical components of thrust are transmitted directly from the linkage through the support, thus relieving the piston of all lateral stresses.

Referring to the drawings:

Fig. 1 is a vertical longitudinal section through a jack embodying the present improvements and illustrating the jack in its retracted position;

Fig. 2 is a plan view of the jack shown in Fig. 1;

Fig. 3 is a side elevation of the jack shown in Fig. 1, with the parts in their extended or operative position;

Fig. 4 is an end view of the jack looking at Fig. 3 from the left; and

Fig. 5 is a section on line 5—5 of Fig. 1.

For facility in description, it might be stated that the jack comprises three main elements, the supporting bracket A, a lazy tong linkage B, and a cylinder and piston operating mechanism C all connected together for permanent mounting as a unit on a vehicle.

The bracket A includes a top portion $A^1$ and a pair of depending side portions $A^2$, thus forming an inverted U-shaped member which acts as a housing for the lazy tong linkage. The side portions $A^2$ at the ends of the support extend somewhat beyond the top portion $A^1$ (at the left end further than at the right) and are bent inwardly to present flanges $a$ riveted to a pair of angle brackets $A^3$ which serve not only to lend rigidity to the supporting bracket but also as a means for attaching the support to the vehicle. Of course, it will be understood that other devices may be employed for mounting the jack according to the type of vehicle and the position in which the jack is located thereon.

The lazy tong linkage B includes two upper link members $B^1$ and $B^2$ pivotally connected together intermediate their ends by a pivot pin $B^3$ and two lower link members $B^4$ and $B^5$ pivotally connected one to each of the upper link members at the lower ends thereof by pivot pins $B^6$ and $B^7$, respectively, the lower link members in turn, at their lower ends, being pivotally connected by a pivot pin $B^{13}$, one to the other and to a shoe or bearing plate $B^8$ which, in the extended position of the jack, rests upon the ground. The link members $B^1$, $B^2$, $B^4$ and $B^5$ are each of double construction, i. e., built of spaced parallel link elements held against separation by the pivot pins which for this purpose are formed with heads $b$ at their outer ends, and held in proper spaced relation by cylindrical spacing members $b^1$ mounted one on the pivot pin $B^3$, and another on the pivot pin $B^6$ which connects the link members $B^2$ and $B^4$.

The upper link member $B^1$ at its upper end is pivotally secured to the supporting bracket A by a pivot pin $a^1$, while the other upper link member $B^2$ at its upper end is movable along the supporting bracket and for this purpose is connected to the bracket and to the piston $C^1$ of the cylinder and piston mechanism C by a pin $C^2$ extending transversely of the bracket and passing through holes formed in the link member and the piston and which is provided at its opposite ends with rollers $c$ (see Fig. 5) journalled on the pin and having reduced portions arranged to track in slots $A^4$ formed in the opposite side portions $A^2$ of the supporting bracket. Now it will be seen that when the piston $C^1$ is in its leftmost position, the lazy tong linkage will be in its normal or retracted position (see Fig. 1), whereas when the piston is moved to the right (see Fig. 3) the lazy tong linkage will be extended to effect the raising of the vehicle. It might be stated here, that the pin $C^2$ is held against lateral movement by a cotter pin $c^1$ extending transversely through the pin $C^2$ and projecting into a slot $c^2$ cut in the piston adjacent its end and near the upper side thereof. The slot $c^2$ serves to facilitate assembling the parts as does also a hole $c^4$ drilled in the top portion $A^2$ of the bracket immediately above the cotter pin.

The piston $C^1$ of the cylinder and piston operating mechanism C is arranged for reciprocable movement in a cylinder $C^{14}$ threaded into a reinforcing block $C^3$ permanently secured adjacent an inner end face of the supporting bracket A. The cylinder, at the end remote from the bracket is closed by a cylinder head $C^4$ formed with a hole $C^5$ centrally located, and which serves to permit liquid to be introduced into the cylinder to effect the outward movement of the piston during the extension of the jack and to be returned to the source when the piston moves back into the cylinder during the retraction of the jack. The head $C^4$ is also provided with a tapped hole $C^6$ to allow the escape of air when the system is initially filled with liquid, and which is plugged after the initial filling takes place. The cylinder at its opposite end is closed by a head $C^7$ formed with a hole $C^8$ through which the piston passes, and the cylinder at this point is made liquid-tight by packing means $C^9$ pressed tightly between an inner packing gland $C^{10}$ seated on an annular shoulder $C^{11}$, formed in the inner wall of the cylinder and an outer packing gland $C^{12}$ forced against the packing means by the cylinder head $C^7$ which is threaded on the cylinder $C^{14}$. The cylinder head $C^7$ is formed with notches $C^{13}$ to facilitate screwing it in place during the assembly of the parts. The inner packing gland is drilled with holes $c^3$ to allow the liquid from the cylinder to pass therethrough and thus prevent the packing from drying out.

Reverting again to the lazy tong linkage, it will be observed that the pivot pin at $a^1$ which secures the link member $B^1$ to the supporting bracket is offset from or located above the line of movement of the upper end of the link member $B^2$ so that when the jack is in its retracted position, the link member $B^2$ will lie parallel with the upper and lower edges of the supporting bracket A and directly in line with the piston $C^1$. It will also be observed that the link member $B^2$ is considerably longer than the link member $B^1$ and, although the pivot pin $B^3$ connecting the two together is located substantially at the center of the link member $B^1$, it is much nearer to the upper end of the link member $B^2$ than to the lower end thereof. Furthermore, the lower link members $B^4$ and $B^5$ are longer than would otherwise be the case were the two upper members of the same length, since in such a case the lower links would be just half the length of the upper links. In the present instance, the lengths of the lower links are so proportioned that the link $B^5$ in its retracted position, will rest in contact with the upper link $B^2$ while at the same time permitting the pivot point $B^{13}$ where the shoe $B^8$ is connected to the linkage to be located, when the linkage is extended, on a line or close to a line passing through the pivot pin $B^3$ and perpendicular to the supporting bracket.

With the foregoing arrangement, it will be seen that for a comparatively short travel of the piston $C^1$, a comparatively long extension of the linkage results, while at the same time the maximum in compactness is obtained. Then, too, with the instant arrangement, the different pivot points, when the linkage is in its retracted position, are staggered, i. e., are arranged asymmetrical, a feature which aids materially in the proper construction of the means for effecting the retraction of the linkage, and which are described immediately below.

In order to effect the retraction of the linkage and also insure against rattling of the parts when the linkage is in its retracted position, there are provided at the pivotal points, torsion springs $B^9$ encircling the pivot pins $B^3$, $B^6$ and $B^7$ and having their respective ends engaging behind cross pins $b^2$ extending between the side elements of each link member, i. e., each spring has one end engaging behind a pin associated with one link and its opposite end engaging behind a pin associated with the link connected thereto at the point where the spring is located. In order that sufficient torsional effect may be obtained to effect the retraction of the parts, the springs at the pivotal points $B^3$ and $B^6$ are made large (the spacing members $b^1$ at such points being correspondingly large in diameter properly to mount the springs) and it is quite obvious that such large springs could not be used were the pivotal points not staggered, as previously mentioned.

The torsion spring between the upper link $B^1$ and the lower link $B^5$ is smaller than the others, in order not to interfere with the piston $C^1$ when the linkage is in its retracted position (see Fig. 1). As a matter of fact, the piston at this point, i. e., at its outer end, is recessed slightly at the bottom to provide clearance for the lower link when the latter is in its retracted position.

The shoe $B^8$ which is connected to the linkage at its lower end includes a flat metal base member formed with flanges $B^{10}$ at its lateral edges to give rigidity, and having secured thereto, either by riveting or spot-welding, a member $B^{11}$ presenting a pair of ears $B^{12}$ extending upwardly and provided with holes for the pivot pin $B^{13}$ that secures it to the linkage. In order to prevent rattling of the shoe when the jack is in its retracted position, the base member $B^9$ is formed with struck-up protrusions $b^3$ while the member $B^{11}$ is provided with a small flange $b^4$ struck up at one edge thereof, said flange and one of the protrusions $b^3$ being adapted to rest against the link members $B^4$ and $B^5$, respectively, at the lower edges thereof.

It might be stated here, that the side elements comprising the link members $B^4$ and $B^5$ are arranged adjacent the inner faces of the elements comprising the link members $B^1$ and $B^5$. Consequently, there are provided notches $b^5$ in the edges of the inner members, to give clearance for the cross pins $b^2$ wherever needed and for the pivot pin $a^1$.

From the foregoing description, it is thought the operation of the jack will be clear without going into further detail. It might be mentioned at this time, that one of the practical advantages secured from the instant arrangement has been an increase in road clearance of about one and one-half (1½) inches over a jack of equivalent capacity and having the same degree of extensibility as here. An advantage of this character can be readily appreciated if one stops to consider the small space available at the underside of the present day vehicle.

In the accompanying drawings the invention has been shown merely by way of example and in preferred form, and obviously, many variations and modifications may be made therein which will still be comprised within its spirit. It is to be understood, therefore, that the invention is not limited to any specific form or embodiment, except insofar as such limitations are specified in the appended claims.

Having thus described my invention, what I claim is:

1. An extensible and retractable vehicle jack including, in combination, a support, a plurality of links arranged in lazy tong formation, the end of one of said links being pivotally secured to said support and the end of another of said links being movable along said support, and means for applying a force to said second mentioned link at the movable end thereof to effect the extension of the lazy tong linkage, said force being exerted in a line co-directional with a line passing longitudinally through one of said links when in its retracted position.

2. An extensible and retractable vehicle jack including, in combination, a support, a plurality of links arranged in lazy tong formation, the end of one of said links being pivotally secured to said support and the end of another of said links being movable along said support, and means for applying a force to said second mentioned link at the movable end thereof to effect the extension of the lazy tong linkage, said force being exerted in a line coincident with a line passing longitudinally through one of said links when in its retracted position.

3. An extensible and retractable vehicle jack including, in combination, a support, a plurality of links arranged in lazy tong formation, one of said links at its end being pivotally secured to said support and another of said links at its end being movable along said support, and a cylinder and piston mechanism secured to said support and operably connected to the linkage to effect the extension thereof, said piston in operation being movable in a line co-directional with a line passing longitudinally through one of said links when in its retracted position.

4. An extensible and retractable vehicle jack including, in combination, a support, a plurality of links arranged in lazy tong formation, one of said links at its end being pivotally secured to said support and another of said links at its end being movable along said support, and a cylinder and piston mechanism secured to said support and operably connected to the linkage to effect the extension thereof, one of said links when in its retracted position being in alinement with said support.

5. An extensible and retractable vehicle jack including, in combination, a support, a plurality of links arranged in lazy tong formation, one of said links at its end being pivotally secured to said support and another of said links at its end being movable along said support, and a cylinder and piston mechanism secured to said support and operably connected to the linkage to effect the extension thereof, one of said links when in retracted position being in alinement with the cylinder and piston mechanism.

6. An extensible and retractable vehicle jack including, in combination, a support, a plurality of links arranged in lazy tong formation, one of said links having an end pivotally secured to said support and another of said links having an end movable along said support, and means connected to said second mentioned link at the movable end thereof and operable to effect the extension of the jack linkage, the pivotal connection between the first mentioned link and the support being located out of the line of movement of said movable end in order that the second mentioned link in its retracted position may be in alinement with the linkage extending means.

7. An extensible and retractable vehicle jack including, in combination, a support, a plurality of links arranged in lazy tong formation, one of said links at an end thereof being pivotally secured to said support, and another of said links at an end thereof being connected to said support but movable therealong, cylinder and piston mechanism connected to the second mentioned link at the end thereof and operable to move the same to effect the extension of the linkage, the pivotal connection between the first mentioned link and the support being located out of the line of movement of the piston in order that the second mentioned link in its retracted position may rest in alinement with said piston.

8. An expansible and retractable vehicle jack including, in combination, a support, a plurality of links arranged in lazy tong formation, one of said links having an end pivotally secured to said support and another of said links having an end movable along said support, means connected to said second mentioned link at the movable end thereof and operable to effect the extension of the jack linkage, the pivotal connection between the first mentioned link and the support being located out of the line of movement of said movable end in order that the second mentioned link in its retracted position will be in alinement with the linkage extending means, and a second pair of links pivotally connected together and to the first mentioned link, one of said latter links in its retracted position being parallel with and resting against the link in alinement with the linkage extending means.

9. A combination according to claim 8, wherein cylinder and piston mechanism are provided for operating said linkage, the cylinder of said mechanism being fixedly mounted on said support.

HAROLD J. MARLOWE.